United States Patent [19]
Ko

[11] Patent Number: 5,497,204
[45] Date of Patent: Mar. 5, 1996

[54] PICTURE MEMORY SYSTEM FOR VIDEO PRINTER

[75] Inventor: Han I. Ko, Suwon, Rep. of Korea

[73] Assignee: Samsung Electronics Co., Ltd., Kyungki, Rep. of Korea

[21] Appl. No.: 378,950

[22] Filed: Jan. 26, 1995

Related U.S. Application Data

[63] Continuation of Ser. No. 113,753, Aug. 31, 1993, abandoned.

[30] Foreign Application Priority Data

Aug. 31, 1992 [KR]  Rep. of Korea ............... 92-15691

[51] Int. Cl.$^6$ ............................................. H04N 1/21
[52] U.S. Cl. ...................... 348/715; 358/479; 360/72.2
[58] Field of Search ................................. 358/444, 403, 358/479; 348/714, 715, 718, 719, 231; 360/72.2; H04N 1/21, 1/23

[56] References Cited

U.S. PATENT DOCUMENTS

| | | | |
|---|---|---|---|
| 4,035,832 | 7/1977 | Stalley et al. | 348/715 X |
| 4,181,914 | 1/1980 | Inaba et al. | 348/718 |
| 4,489,551 | 12/1984 | d'Alayer de Costemore d'Arc | 348/714 |
| 4,703,356 | 10/1987 | Herzog et al. | 348/715 |
| 5,087,979 | 2/1992 | Schaertel | 348/444 |
| 5,153,726 | 10/1992 | Billing | 348/719 |

FOREIGN PATENT DOCUMENTS

| | | | |
|---|---|---|---|
| 1-297974 | 12/1989 | Japan | H04N 1/21 |
| 2-202766 | 8/1990 | Japan | H04N 1/21 |
| 3-236674 | 10/1991 | Japan | H04N 1/21 |

*Primary Examiner*—Victor R. Kostak
*Assistant Examiner*—Cheryl Cohen
*Attorney, Agent, or Firm*—Sughrue, Mion, Zinn, Macpeak & Seas

[57] ABSTRACT

The invention relates to a picture memory system for a video printer. Out of continuously incoming video signals, picture signals corresponding to one frame or one field are stored into each of a plurality of semiconductor memories, and the picture just passed can be searched and printed. Therefore, in unilaterally transferred video signals like in television, the desired pictures can be directly printed without incurring the inconvenience of using a video recorder. That is, the multiple steps of recording and reproducing are skipped, and therefore, the degradation of the picture quality can be prevented.

6 Claims, 1 Drawing Sheet

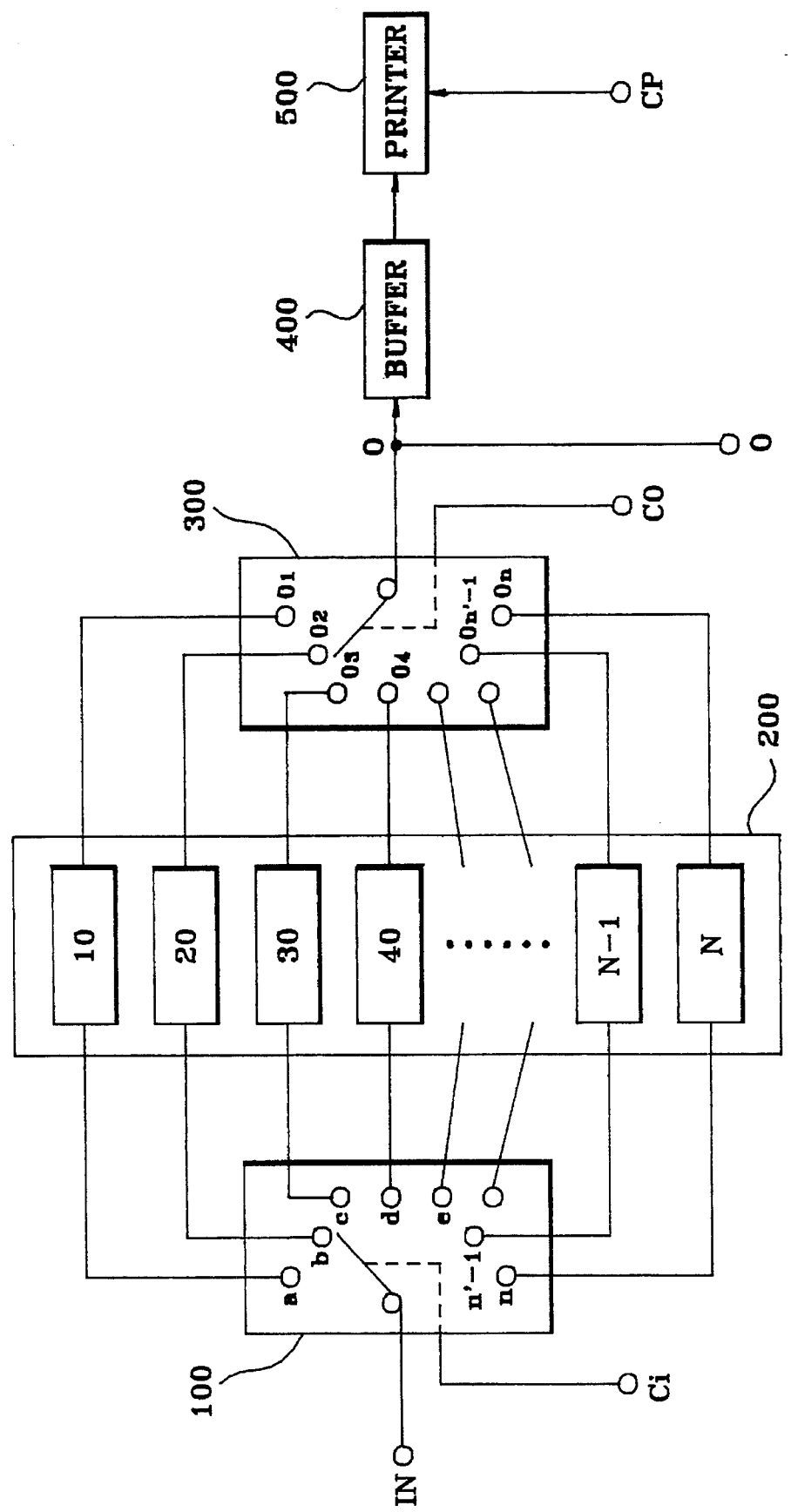
FIGURE

PICTURE MEMORY SYSTEM FOR VIDEO PRINTER

This is a Continuation of application No. 08/113,753, filed Aug. 31, 1993 now abandoned.

BACKGROUND OF THE INVENTION

1. Field of the Invention

The present invention relates to a picture memory system for a video printer, in which, when unilaterally transmitted signals are received in an apparatus such as a television, a portion of video signals for a particular time can be stored in the memory of a printer without using a device such as a video tape recorder, so that, of the received signals, only desired portions can be searched and printed.

2. Description of the Prior Art

Generally, a video printer is connected to a laser disc player, a video camera, a video tape recorder, or the like to print the desired pictures.

If the picture to be printed has been stored in a recording device, the user can reproduce the video tape to print the desired pictures. However, in television, the features such as stopping the appearance of successive pictures onto the screen and storing pictures are not provided. Therefore, the user cannot identify the displayed pictures on screen and is unable to print the desired pictures. In order to print the desired pictures, a video tape recorder can be connected to a television, and then, the received video signals can be recorded on the video tape recorder. Then, the recorded picture data can be reproduced, thereby printing the desired pictures. However, recording and reproducing are very troublesome tasks, and the picture quality can deteriorate undergoing such procedures.

Meanwhile, there is a technique which is disclosed in Japanese Patent Publication No. Sho-62-207090. In this technique, a 1-frame picture memory is utilized as a 2-field picture memory, and there is prevented the degradation of the pictures when the desired pictures are printed in case of storing the momentary pictures.

Thus, the above technique is for preventing the degradation of the pictures when the momentary pictures are printed. However, the present invention is different in that the received video signals are stored as much as for a particular time, and the user searches the desired portion of the pictures in order to print them.

SUMMARY OF THE INVENTION

It is the object of the present invention to provide a picture memory system for a video printer, in which, when video signals received in an apparatus such as a television continue to be unilaterally transmitted, the video signals are stored in a memory for a certain period of time, then the stored video data are erased, then new video signals are stored again, and thus, the displayed pictures are searched in the relevant time period to print the desired pictures.

In achieving the above object, the picture memory system for a video printer in which video signals are stored to print the desired pictures out of the video signal transmitted from the video signal source includes: an input signal switching means for performing selecting operations for unit time intervals in such a manner as to output the received video signals through one of one or more output terminals under the control of input control signals; a memory means composed of at lest one or more semiconductor memory devices, for storing the output signals of the input signal switching means into the relevant portion of the memory means; an output signal switching means for selecting the relevant portion of the memory means in accordance with the control of the output control signals to output the relevant video signals stored into the selected semiconductor memory device; a buffer for adjusting an output level of the video signals output from the output signal switching means; and a printer for printing the output picture signals of the buffer in accordance with print control signals.

BRIEF DESCRIPTION OF THE DRAWING

The above object and other advantages of the present invention will become more apparent by describing in detail the preferred embodiment of the present invention with reference to the attached drawing in which:

FIG. 1 is a block diagram showing an embodiment of the picture memory system for a video printer according to the present invention.

DESCRIPTION OF THE PREFERRED EMBODIMENT

FIG. 1 is a block diagram showing an embodiment of the picture memory system for a video printer according to the present invention. As shown in this drawing, the system includes an input signal switching means 100, a memory means 200, an output signal switching means 300, a buffer 400, and a printer 500.

The input signal switching means 100 consists of an analog switch. By this input signal switching means 100, the video signals which are received from a video signal source through a video signal input terminal IN are divided for each unit time period under the control of input control signals which are input through a input control terminal Ci. The video signal input terminal IN is connected to an output terminal of a video camera or a television, thereby inputting video signals to be printed.

The memory means 200 consists of semiconductor memories 10, 20, . . . , N-1, N, in which the video signals divided for each time unit are stored. The output signal switching means 300 which consists of an analog switch is connected to the output side of the memory means 200. The output signal switching means 300 selectively outputs the video signals of the respective semiconductor memories of the memory means 200 in accordance with the output control signals of the output control terminal Co. The video signals, which are divided for each unit time interval to be stored in the respective semiconductor memories, and which are selected by the output signal switching means 300, are transferred to the buffer 400 in which the output levels are adjusted thereafter.

Further, the printer 500 is connected to the buffer 400, and the printer 500 reads the video signals from the buffer 400 (after the adjustment of the levels) in accordance with the control signals of a print control terminal Cp to print them.

In the system of the present invention described above, when video signals are input through the video signal input terminal IN into the input signal switching means 100, the video signals are stored in the semiconductor memory which is connected to the selected one of the terminals a–n in accordance with the control signals from the input control terminal Ci.

That is, if the terminal a is selected by the input signal switching means 100 in accordance with the input control signals, the video signals are stored into the semiconductor memory 10 of the memory means 200. If the terminal b is selected, the video signals are stored in the semiconductor memory 20. In this manner, in accordance with the control signals from the input terminal Ci, the video signals are stored by one field or one frame unit for the respective unit time intervals into the semiconductor memories 10, 20, . . ., N-1, N.

The input signal switching means 100 operates in such a manner that, after the selection of the terminal a and the lapse of a certain period of time, e.g., 1 second, the switching is made to the terminal b. In this manner, video signals of one field or one frame is stored into the semiconductor memory 10 immediately before carrying out the switching. In this manner, when the switching operations of the input signal switching means 100 arrives to the terminal n, video signals of n frames or n fields are stored into the semiconductor memories 10 to N. Thereafter, the input signal switching means 100 performs the selecting operations starting from the terminal a, and then, store again new video signals starting from the semiconductor memory 10.

If the switching time interval of the input signal switching means 100 is decided to be 1 second, then video signals on the last one frame or last one field out of pictures on the 30 frames or 60 fields which appear in one second will be stored in the semiconductor memories. Therefore, the semiconductor memories stores video signals of n fields or n frames all the time.

If the switching time interval of the input signal switching means 100 is decided to be 0.5 seconds, then video signals of one frame or one field is stored into the semiconductor memories 10, 20, . . . , N-1, N in the same manner as described above. Pictures have a relation to the adjacent fields or frames to a certain degree, and therefore, even if pictures are stored only in certain intervals, the required or adjacent pictures can be stored.

Meanwhile, if the desired picture of past pictures is wanted to be printed, the input switching operations of the video signals are stopped, and one of the terminals 01–0n of the output signal switching means 300 is selected in accordance with the output control signals of the output control terminal Co. Then, a picture is output from one of the semiconductor memories 10, 20, . . . , N-1 which is connected to the selected output terminal.

If a picture which is stored in the semiconductor memory 40 is needed to be printed, the switch of the output signal switching means 300 is connected to the terminal 04 by manipulating the output control signals from the output control terminal Co. Then the video signals, which are output through the output terminal O, and which have been stored in the semiconductor memory 40, are adjusted as to their level, and then, they are output to the printer. Under this condition, if the user wants to print the desired pictures through the printer 500, the printing is carried out in accordance with the control signals of the print control terminal Cp.

According to the present invention as described above, continuously incoming video signals in a television and the like are stored in semiconductor memories, and after the elapsing of a certain period of time, another new portion of video signals are replacingly stored into the memories. Thus, the desired picture which has been just passed can be searched and printed, thereby eliminating the inconvenience of recording the video signals with a video recorder or the like.

What is claimed is:

1. A picture memory system capable of storing video signals from a video signal source to print selectively pictures out of the received video signals, said picture memory system comprising:

input signal switching means for performing selection operations for user-adjustable time intervals so as to output the received video signals through one of a plurality of output terminals under the control of input control signals;

memory means having a plurality of semiconductor memory devices, for storing output signals of said input signal switching means into relevant portions of said memory means in sequence;

output signal switching means for selecting the relevant portions of said memory means in accordance with the control of output control signals to output the relevant video signals stored in the selected semiconductor memory device;

a buffer for adjusting an output level of video signals output from said output signal switching means; and a video printer for printing output picture signals of said buffer in accordance with print control signals.

2. The picture memory system for a video printer as claimed in claim 1, wherein said input signal switching means and said output signal switching means each comprise an analog switch, respectively.

3. The picture memory system for a video printer as claimed in claim 1, wherein said memory means comprises a plurality of frame memories.

4. The picture memory system for a video printer as claimed in claim 1, wherein said memory means comprises a plurality of field memories.

5. The picture memory system for video printer as claimed in claim 1, wherein, when the capacity of the semiconductor memories becomes full, the already stored video signals are erased, and new video signals are stored therein.

6. The picture memory system for video printer as claimed in claim 3, wherein, when the capacity of the semiconductor memories becomes full, the already stored video signals are erased, and new video signals are stored therein.

* * * * *